United States Patent

Drozdowicz

[11] Patent Number: 6,125,223
[45] Date of Patent: *Sep. 26, 2000

[54] SPECTRALLY RESOLVED LIGHT

[75] Inventor: Zbigniew M. Drozdowicz, Orange, Conn.

[73] Assignee: Oriel Corporation, Stratford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/144,431

[22] Filed: Aug. 31, 1998

[51] Int. Cl.[7] .................................................. G02B 6/34
[52] U.S. Cl. .............................. 385/37; 359/570; 359/572
[58] Field of Search .......................... 385/31, 37; 359/15, 359/34, 566, 569–574; 356/328

[56] References Cited

U.S. PATENT DOCUMENTS

| | | | |
|---|---|---|---|
| 3,638,008 | 1/1972 | Keller et al. | 362/572 |
| 3,926,501 | 12/1975 | Hama | 385/31 |
| 4,030,828 | 6/1977 | Sonobe et al. | 356/320 |
| 4,068,121 | 1/1978 | Bringhurst et al. | 250/227.28 |
| 4,274,706 | 6/1981 | Tangonan | 385/37 |
| 4,387,955 | 6/1983 | Ludman et al. | 385/37 |
| 4,544,232 | 10/1985 | Laude | 385/37 X |
| 4,675,860 | 6/1987 | Laude et al. | 359/131 |
| 4,707,056 | 11/1987 | Bittner | 385/31 |
| 4,736,360 | 4/1988 | McMahon | 359/130 |
| 4,752,108 | 6/1988 | Vollmer | 385/14 |
| 4,786,133 | 11/1988 | Gidon et al. | 385/37 |
| 4,934,784 | 6/1990 | Kapany et al. | 385/33 |
| 4,938,553 | 7/1990 | Maerz et al. | 385/14 |
| 4,999,489 | 3/1991 | Huggins | 250/226 |
| 5,148,239 | 9/1992 | Magnussen, Jr. et al. | 356/435 |
| 5,228,103 | 7/1993 | Chen et al. | 385/37 X |
| 5,371,586 | 12/1994 | Chau | 356/301 |
| 5,422,719 | 6/1995 | Goldstein | 356/318 |
| 5,495,332 | 2/1996 | Steiner | 356/328 |
| 5,550,375 | 8/1996 | Peters et al. | 250/343 |
| 5,565,983 | 10/1996 | Barnard | 356/328 |
| 5,596,992 | 1/1997 | Haaland et al. | 600/473 |
| 5,912,751 | 6/1999 | Ford et al. | 359/128 |
| 5,926,272 | 7/1999 | Curtiss et al. | 356/326 |

FOREIGN PATENT DOCUMENTS

WO 94/09850   5/1994   WIPO .

*Primary Examiner*—John D. Lee
*Attorney, Agent, or Firm*—St. Onge, Steward, Johnston & Reens LLC

[57] ABSTRACT

A spectrally resolved monochromatic light is provided which generally comprises an incoherent small source lamp, a concave grating for spectrally resolving the wavelengths of the light to obtain a particular wavelength, and an optical fiber for collecting and transmitting the particular wavelength. The light source can also have more than one optical fiber output, each having a different monochromatic wavelength. An order sorting device, such as a filter or dichroic mirror can be used to filter out the shorter wavelength radiation resulting from higher grating orders.

23 Claims, 4 Drawing Sheets

SPECTRALLY RESOLVED LIGHT

FIELD OF THE INVENTION

The invention relates to an apparatus for a light source. More specifically, the invention relates to an inexpensive, simple apparatus providing a spectrally resolved light source.

BACKGROUND OF THE INVENTION

Perhaps the most common source of spectrally resolved or monochromatic light is a laser. Although single wavelength lasers have become quite common and inexpensive, widely tunable lasers are still very expensive. When a widely tunable source of light is required and lack of coherence is not an issue, incoherent light sources that utilize arc lamps or Tungsten Halogen lamps are frequently used. Their output is optically coupled into additional optical devices and spectrally resolved by narrow band filters or monochromators, which converts the output to a monochromatic spectrum. This approach results in complex and costly systems. FIGS. 1 and 2 show two prior art devices 100; 110 that use expensive coupling optics 13. The present invention, therefore, relates to an improved light source that has continuous wavelength tunability and that dispenses with the need for input slits or coupling optics.

Other devices are known to reduce an optical signal having several avelengths to several optical signals each having a particular wavelength. In telecommunications, optical multiplexer/demultiplexers are often used to either join several optical signals each having a separate wavelength into one signal or to separate an optical signal containing several wavelengths into several signals each having a different wavelength.

U.S. Pat. No. 4,999,489 to Huggins discloses a prior art slab Rowland spectrometer for multiplexing and demultiplexing optical telecommunication signals. This Rowland spectrometer uses an optical fibers for both inputs and outputs to either multiplex or demultiplex several frequencies within a light signal.

U.S. Pat. No. 4,387,955 to Ludman et al. also discloses a multiplexer/demultiplexer that uses a holographic reflective grating. The Ludman apparatus transmits either a coherent optical signal or an optical signal with a limited coherence over an input optical fiber. U.S. Pat. No. 4,707,056 to Biffner discloses a multiplexer/demultiplexer that uses a light conducting fiber and a slab waveguide for inputting a radiation source.

U.S. Pat. No. 5,550,375 to Peters et al. discloses an infrared-spectrometric sensor for detecting the presence of certain gases. The Peters et al. spectrometric sensor operates by using a concave mirror grating to separate the wavelengths from an infrared radiation source and measuring the absorption of the wavelengths in the gas to determine the presence of certain gases. The Peters et al. apparatus, however, uses an input slit.

None of the above multiplexer/demultiplexer or spectrometers, however, disclose an apparatus for creating a spectrally resolved light source that uses only an inexpensive, incoherent, spatially expansive, omnidirectional radiating source of light.

What is desired, therefore, is a light source that uses a relatively inexpensive, high power, and spatially expansive lamp, without expensive coupling optics to provide spectrally resolved output.

SUMMARY OF THE INVENTION

Accordingly, an object of the present invention is to provide a spectrally resolved light source that does not require the use of coupling optics and input apertures or slits.

It is another object to provide a spectrally resolved light source of the above type that has a high power output.

It is yet another object to provide a spectrally resolved light source of the above type that uses less parts than previous spectrally resolved light sources and is economical to produce.

These objects of the invention are achieved by an efficient high output spectrally resolved light source which comprises an small incoherent source light for radiating a light having different wavelengths, a concave grating for spectrally resolving the wavelengths of the light to obtain a particular wavelength, and an optical fiber for collecting and transmitting the particular wavelength.

DETAILED DESCRIPTION OF THE INVENTION

Figure 1:
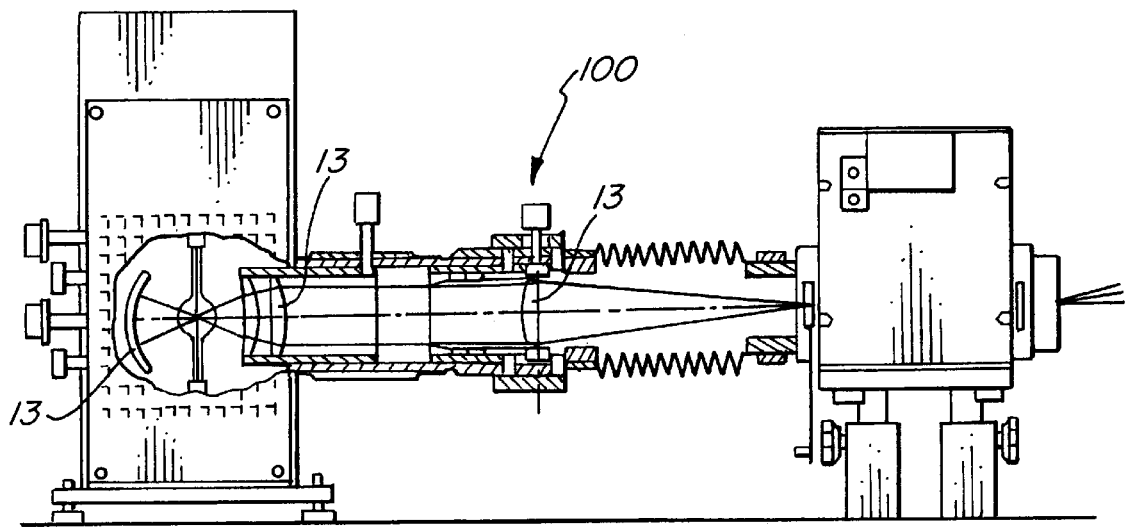
FIG. 1 is a front view of a first prior art apparatus.
Figure 2:
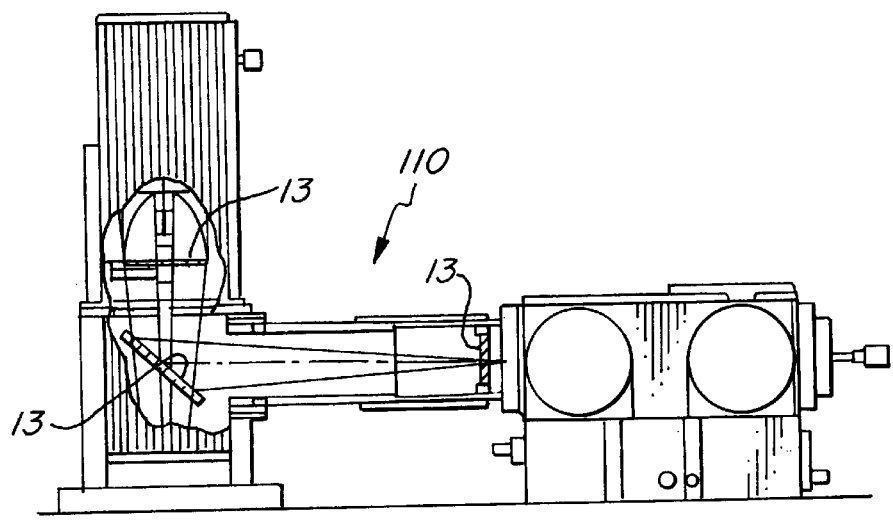
FIG. 2 is a front view of a second prior art apparatus.
Figure 3:
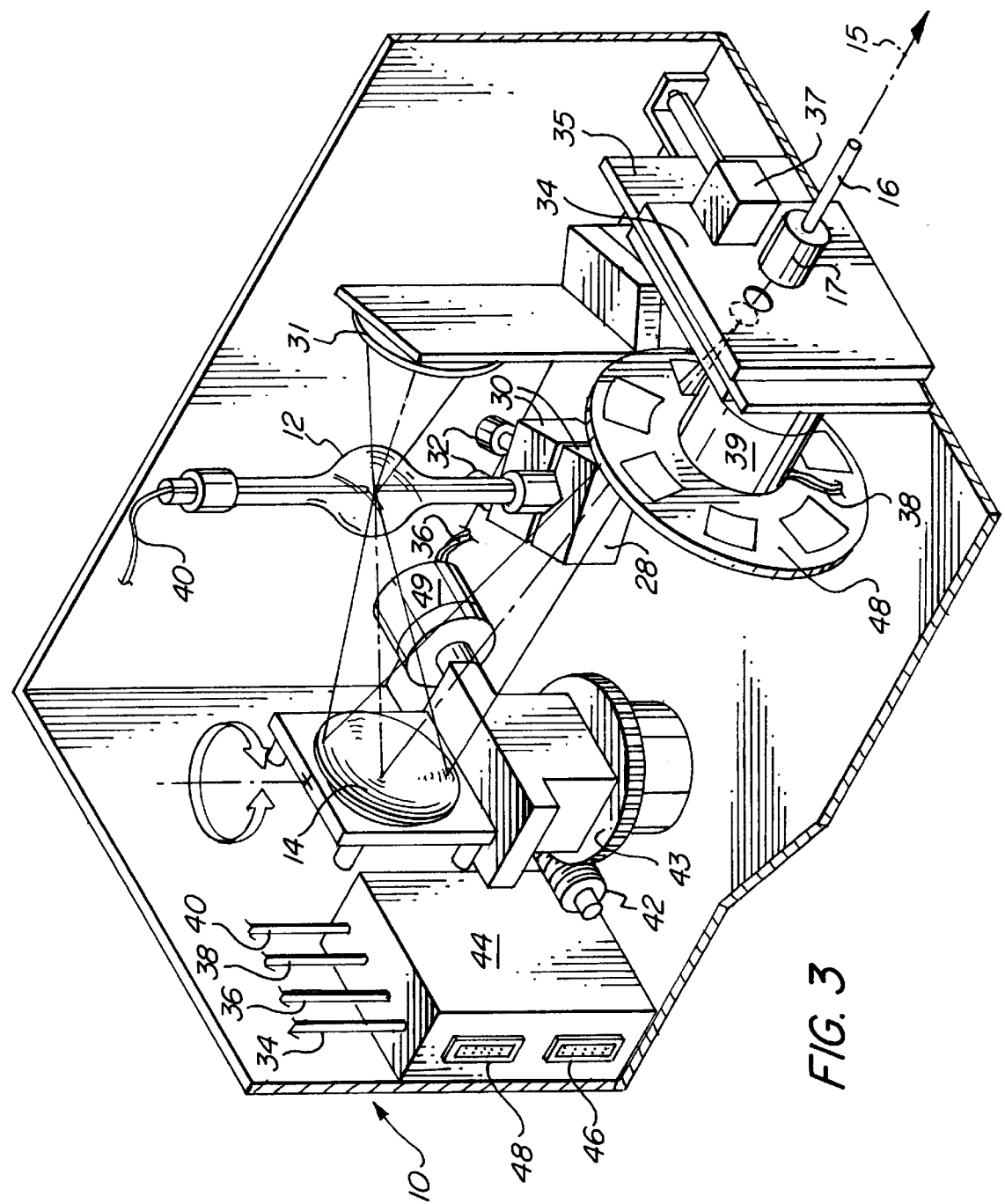
FIG. 3 is an isometric view of the apparatus for a spectrally resolved monochromatic light of the present invention.

The spectrally resolved monochromatic light 10 of the present invention dispenses with coupling optics and input apertures or slits, typical of separate light sources and monochromators, while providing monochromatic optical output. Referring to FIG. 3, the optical components of the basic system consists of a spacially expansive source lamp 12, a concave grating 14 and an optical fiber 16 or fiber bundle properly shaped and positioned to capture just the wavelength of interest. Compared to prior spectrally resolved lights, a reduction of the number of components provides a less expensive and more efficient optical system.

The lamp 12 is located in a lamp assembly 28, which comprises two v-shaped blocks 30 that clamp the lamp in place, and two lamp screws 32 which tighten the two blocks 30 together. It is preferable that the lamp assembly be pre-aligned because arc lamps have small arcs and therefore require precise adjustments to deliver optimal output. This is particularly critical in this light, since arc position effects both output level and its wavelength. The lamp 12 is located between a concave grating 14 and rear reflector 31. The rear reflector 31 reflects the light from the lamp 12 and reimages the arc in the immediate vicinity of itself to increase the power output of the lamp. The image of the arc is preferably positioned above itself to minimize spectral broadening since the horizontal width of the arc is the limiting factor in determining the narrowest output bandwidth. The light from the lamp 12 diffracts off the concave grating 14 and passes through a filter wheel 48 which has a number of different long pass filters 18. The monochromatic light 15 is collected by the optical fiber 16 for transmission.

Several functions of the spectrally resolved monochromatic light 10 can be remotely adjusted by a computer or a hand controller (not shown), which respectively interface at locations 46 and 48 to a controller 44. The controller 44 is connected to cables 34, 36, 38, and 40. The concave grating 14 is rotatably adjusted by motor 49 which is controlled through cable 36. The motor 49 moves the worm drive 42 which rotatably moves the concave grating mounting gear wheel 43. The lamp is powered through cable 40. The filter wheel 48 is rotatably adjusted by a motor 39 which is controlled through cable 38. Also, a shutter 35 is movably adjusted by a solenoid 37 which is controlled through cable 34 to discontinue transmission of the monochromatic light 15.

Figure 4:
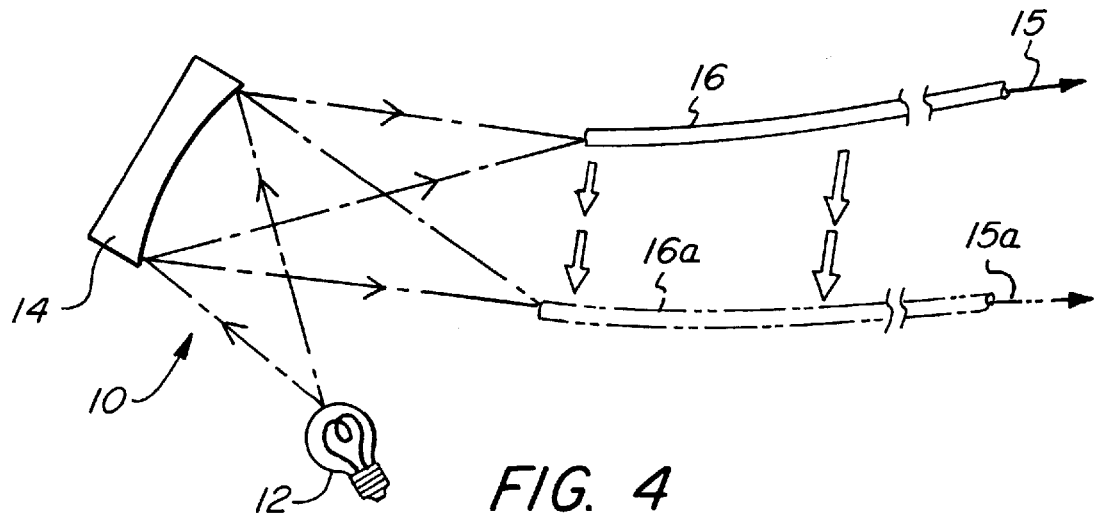
FIG. 4 is a top view of the apparatus for the spectrally resolved monochromatic light of FIG. 3, which shows the movement of the fiber optic cable.

A single optical fiber 16 can be used to collect and transmit the monochromatic light 15. To adjust the wavelength of the collected light 15, the position of the concave grating can be rotatably adjusted as shown in FIG. 3. Alternatively, as shown in FIG. 4, the position of the optical fiber could be moved from position 16 to 16a to collect a different wavelength of light 15a when a grating optimized for spectrograph applications is used. Additionally, beam probes (not shown) can be attached to the output of the optical fiber 16 to collimate or focus the light 15.

There are a number of acceptable spacially expansive lamps 12 and radiating elements that have a stably positioned and reasonably sized radiating element. By "spatially expansive source" is meant an omnidirectional, radiating lamp which includes no apertures, slits or other structure specifically designed to limit the spatial extent of the source. Examples of acceptable spatially expansive radiating elements that are typically on the millimeter and sub-millimeter scale include quartz tungsten halogen lamps, arc lamps (Xe, Hg, Hg/Xe, etc.), deuterium UV lamps, smaller IR glowers, and sonoluminescent sources. This invention was first reduced to practice with 150 Watt Xe, 200 Watt Hg and 200 Watt Hg(Xe) arc lamps. These radiating elements can be coupled with a concave grating to produce efficient sources of spectrally resolved radiation. These radiating elements are also particularly well suited for illumination of fibers and fiber bundles because a number of commercially available corrected holographic gratings can provide fiber optics matching conditions having almost F/2 illumination.

Figure 5:
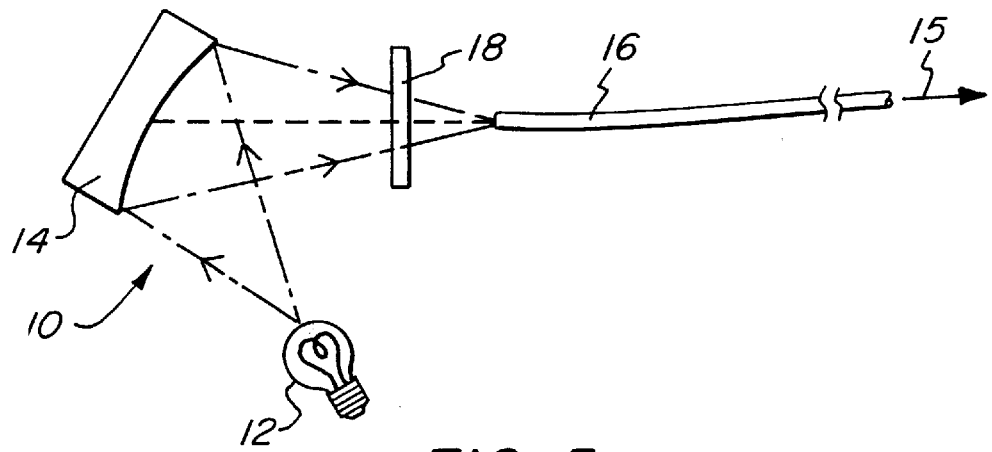
FIG. 5 is a top view of the spectrally resolved monochromatic light of FIG. 3 used in conjunction with a long pass filter.

Referring to FIG. 5, a filter 18, such as a long pass filter or a dichroic mirror, is placed between the concave grating 14 and the optical fiber 16 to remove shorter wavelength radiation diffracted at higher grating orders. A filter 18 placed between the source lamp 12 and the concave grating 14 can also limit heat loading on the grating 14, which may be necessary with higher power lamps because replicated gratings have a limited temperature range. The use of a filter 18 will allow the use of a higher power radiating element 12 to deliver more photons at the wavelengths of interest. Grating design may be optimized to account for the presence of one or more filters in the optical path if ultimate imaging performance is desired.

Figure 6:
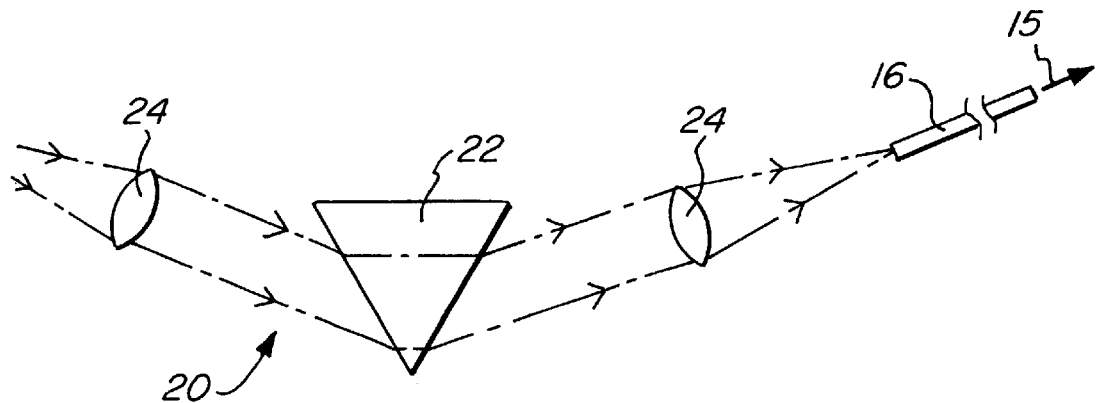
FIG. 6 is a top view of a second embodiment of the spectrally resolved monochromatic light of FIG. 3, which uses a prism.

FIG. 6 shows a second embodiment 20 of the invention which uses a prism 22 instead of a concave grating 14. Higher broad band efficiencies in the UV spectrum can be obtained by going to a prism based dispersive system that uses proper collimating and focusing, either refractive or reflective, optical elements 24.

Wavelength tuning and selecting can be accomplished in a number of different ways, such as the use of spectrograph concave holographic gratings, monochromator concave holographic gratings, Rowland circle gratings or collimating and focusing optics and prism or plane gratings. In the first reduction to practice, an aberration corrected holographic concave monochromator grating is used which is blazed at 350 nanometer and allows an output control down to approximately a 5 nanometer bandwidth.

Corrected concave holographic gratings used in conjunction with single optical fibers or small optical fiber bundles can provide optimal performance for illumination because they can produce an almost one to one image of the source at a high numerical aperture (N.A.). For a typical configuration in which a grating is utilized that is designed to work with a diode or CCD array, the output falls on a plane and a collecting fiberoptic element can be easily positioned using a linear translator to capture the correct wavelength.

Monochromator concave gratings can also be used. These are also corrected to produce a good image of the source. Wavelength tuning is obtained by rotating the grating. The selection of commercially available monochromator concave gratings, however, is more limited than other types of gratings.

Rowland circle gratings can be used if more reciprocal dispersion is needed and image quality is of less importance. Wavelength tuning would be accomplished by translating either the input or the output over the Rowland circle. These types of gratings do not usually provide the low f/# useful for efficient illumination of fibers.

Figure 7:
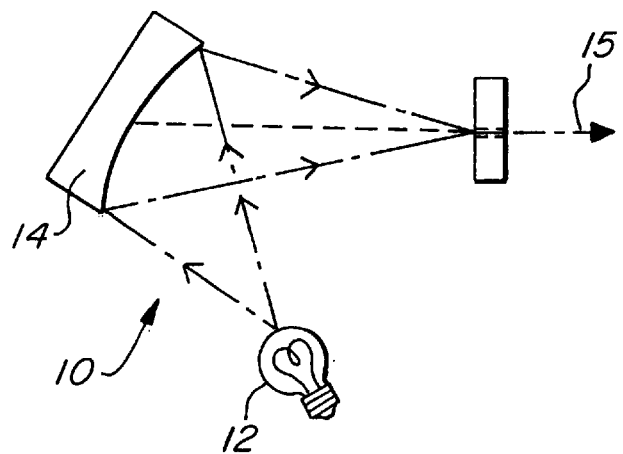
FIG. 7 is a top view of the apparatus for the spectrally resolved monochromatic light of FIG. 3, which uses an output slit.

So long as the width of the fiber optic cable 16 is small enough, the cable can act as an output slit such that the cable 16 defines the output bandwidth. If the fiber optic cable 16 is too wide, however, an output slit 19 may be necessary as shown in FIG. 7. If an output slit 19 is used, then the present invention can operate without an optic cable. In such a case, the apparatus could be supplemented with a collimating or a uniform irradiance attachment.

The spectrally resolved light source can also have a reverse arrangement wherein the source is placed in the normal output location of a spectrograph grating and the optical output is collected from the normal input side. This would allow a very stable attachment point for the fiber and make the system more stable with respect to accidental pulls on the fiber bundle. Wavelength tuning could be then accomplished by linear translation of the source.

Fast wavelength switching, which is useful for switching excitation wavelength in differential spectral imaging, can be obtained with fiberoptic illumination by assembling a very low mass system. This is somewhat like the operation of a read/write head in computer hard disk system, which translates an unconnectorized fiber or fibers to proper outputs locations. Switching between a limited number of wavelengths can be done by utilizing a divided, such as bifurcated or trifurcated, fiber bundle with its different legs at various wavelength locations. Fast shutters can then be used to select the wavelength of interest.

Light level stabilization can be accomplished by feeding some of a lamp output to a stable photosensor and using its output to create an error signal for the power supply. Alternatively, a grating diffraction order not used for the output could be sampled by a photosensor to provide stabilization at the wavelength of main interest and thus minimize system output variation due to different rates of output aging or responding to environmental variations at different wavelengths.

The natural form of order sorting can be accomplished in grating based implementation by selecting a blazed grating with the blaze wavelength close to the shortest wavelength of interest. Diffraction efficiency decreases fairly quickly when going toward shorter wavelengths and thus no order sorting is necessary for a short wavelength range. This increases the throughput and reduces the cost of the system. If longer wavelengths are to be obtained with the same grating, order sorting may need to be accomplished in the usual fashion. If a prism based implementation is used, order sorting will not be required.

Spreading of the spectrum over a linear dimension also spreads the heat and removes the need for use of water filters or other heat removing optics if a high power source is used, which results in a simpler, lower cost system.

Referring to FIG. 3, in operation, a lamp 12 is placed in the lamp assembly 30 and tightened between the two v-shaped blocks 30 using the two lamp screws 32. Using the motor 49, the user adjusts he concave grating 14 to obtain the desired wavelength of collected light 15. The proper filter, if any, is obtained by adjusting the filter wheel 48 until the desired filter is in the path of collected light 15. An optical cable 16, if no output slit 19 exists, is placed at the output 17 of the device to transmit the collected light 15. The transmission of the collected light 15 can be discontinued by either turning off the lamp or engaging the shutter 35 in the path of the collected light.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A spectrally resolved monochromatic light, comprising:
   a spatially expansive source having incoherent rays of light at different wavelengths;
   a concave grating for spectrally resolving rays of light directly received from said spatially expansive source to obtain rays of a particular wavelength, said concave grating being rotatable about a central axis so that the particular wavelength obtained may be varied; and
   an optical fiber positioned to collect the rays of a particular wavelength from said concave grating without the rays having passed through an optically corrective element, and to transmit light of the particular wavelength.

2. The spectrally resolved monochromatic light of claim 1, wherein said concave grating is a holographic concave spectrograph grating.

3. The spectrally resolved monochromatic light of claim 1, wherein said concave grating is an aberration corrected monochromator concave grating.

4. The spectrally resolved monochromatic light of claim 1, wherein said concave grating is a Rowland circle grating.

5. The spectrally resolved monochromatic light of claim 1, wherein said concave grating spectrally resolves the rays of the light to obtain a plurality of particular wavelengths, and further comprising a plurality of optical fibers for collecting and transmitting the plurality of particular wavelengths.

6. The spectrally resolved monochromatic light of claim 1, further comprising an output slit located between said concave grating and said optical fiber for preventing a transmission of light of some wavelengths.

7. The spectrally resolved monochromatic light of claim 1, further comprising an order sorting filter for removing radiation within a particular wavelength range.

8. The spectrally resolved monochromatic light of claim 7, wherein said order sorting filter is a long pass filter for removing shorter wavelength radiation due to higher order grating diffraction and wherein the long pass filter is located between said concave grating and said optical fiber.

9. The spectrally resolved monochromatic light source of claim 7, wherein said filter is a dichroic mirror for removing a range of radiation wavelengths.

10. The spectrally resolved monochromatic light source of claim 9, wherein said filter is for preventing heat loading on said concave grating and wherein said filter is located between said spatially expansive source and said concave grating.

11. The spectrally resolved monochromatic light of claim 1 wherein said spatially expansive source is prealigned relative to said concave grating.

12. The spectrally resolved monochromatic light of claim 1 including a v-block for prealigning said source relative to said grating.

13. A spectrally resolved monochromatic light source, comprising:
   a spatially expansive source having incoherent rays of light at different wavelengths;
   a concave grating for spectrally resolving rays of light directly received from said spatially expansive source to obtain rays of a plurality of particular wavelengths, said concave grating being rotatable about a central axis so that the particular wavelengths obtained may be varied;
   a filter for removing undesired radiation from the plurality of particular wavelengths; and
   a plurality of optical fibers positioned to collect the rays of particular wavelengths from said concave grating without the rays having passed through an optically corrective element, and to transmit light of the plurality of particular wavelengths.

14. The spectrally resolved monochromatic light source of claim 13, wherein one of the plurality of particular wavelengths is used as a reference source for measuring and adjusting the output level of the source light.

15. The spectrally resolved monochromatic light source of claim 13, wherein said filter is a long pass filter for removing short wavelength radiation.

16. The spectrally resolved monochromatic light source of claim 13, wherein the filter is a dichroic mirror for removing short wavelength radiation.

17. The spectrally resolved monochromatic light source of claim 13, wherein the concave grating is a holographic concave spectrograph grating.

18. The spectrally resolved monochromatic light source of claim 13, wherein the concave grating is a holographic monochromator concave grating.

19. The spectrally resolved monochromatic light source of claim 13, wherein the concave grating is a Rowland circle grating.

20. A spectrally resolved monochromatic light source, comprising:
   a radiating element consisting essentially of an incoherent point source light for radiating a light having different wavelengths;
   means for spectrally resolving the wavelengths of said light directly received from said radiating element to obtain a particular wavelength;
   at least one collimating optical element;
   at least one optical focusing element; and
   an optical fiber for collecting the particular wavelength directly from said at least one optical focusing element and for transmitting the particular wavelength.

21. The spectrally resolved monochromatic light source of claim 20, wherein the means for spectrally resolving the wavelengths is a prism.

22. The spectrally resolved monochromatic light source of claim 20, wherein the means for spectrally resolving the wavelengths is a plane reflection grating.

23. The spectrally resolved monochromatic light source of claim 20, wherein the means for spectrally resolving the wavelengths is a transmission grating.

* * * * *